G. P. MARQUARDT.
ANIMAL TRAP.
APPLICATION FILED SEPT. 5, 1913.

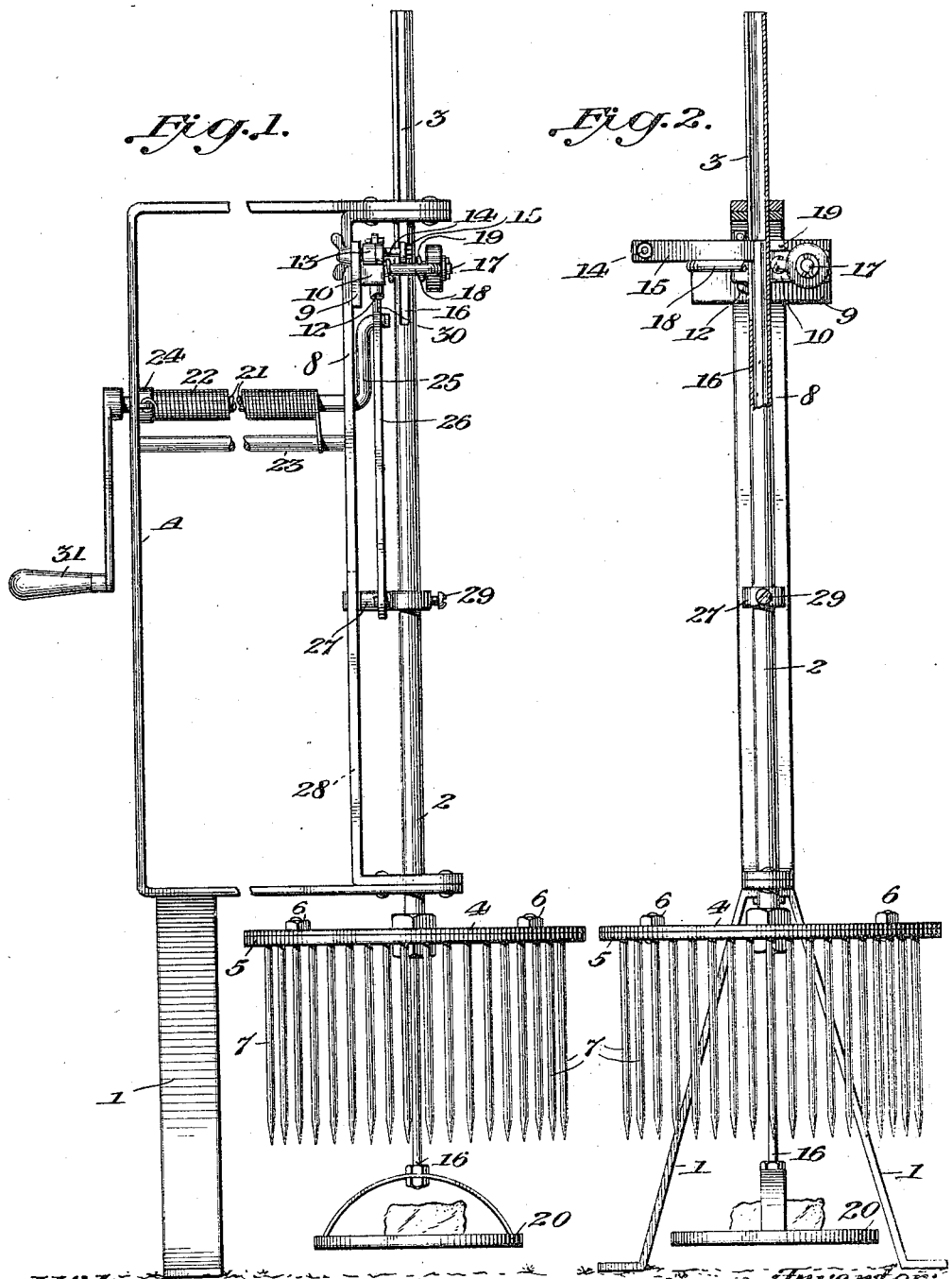

1,144,607.

Patented June 29, 1915.
2 SHEETS—SHEET 2.

Witnesses:
Lloyd W. Patch
O. A. Hammond

Inventor:
George P. Marquardt
By Louis Baggot Co
his Attys.

UNITED STATES PATENT OFFICE.

GEORGE P. MARQUARDT, OF ROCHESTER, MINNESOTA.

ANIMAL-TRAP.

1,144,607. Specification of Letters Patent. Patented June 29, 1915.

Application filed September 5, 1913. Serial No. 788,320.

*To all whom it may concern:*

Be it known that I, GEORGE P. MARQUARDT, citizen of the United States, residing at Rochester, in the county of Olmsted and State of Minnesota, have invented certain new and useful Improvements in Animal-Traps, of which the following is a specification.

My invention relates to an improvement in animal traps, and the object is to provide a disk carrying spears which project at right angles to the disk. This disk is adapted to be moved vertically upon the vertical movement imparted to the bait holder, thereby causing the spears to surround the bait holder and penetrate any object or animal which is endeavoring to remove the bait from the bait holder.

A further object is in the provision of means which causes the parts, that is, both the bait holder and spear disk, to automatically return to their normal positions after an operation and the disengagement of the animal from the spears.

This invention relates to still other novel features of construction and combinations of parts which will be hereinafter described and pointed out in the claims.

Figure 3:
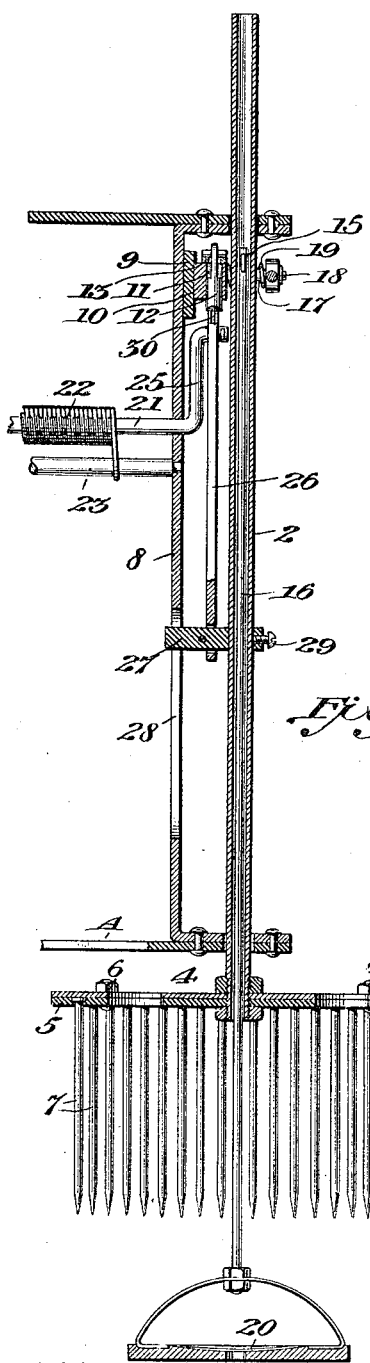
Figure 4:
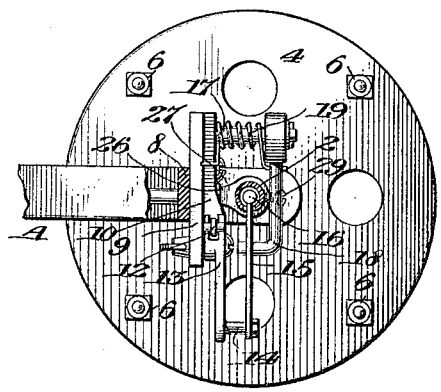
Figure 5:
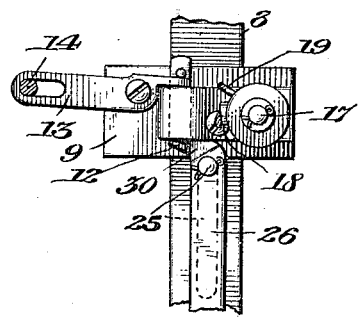

In the accompanying drawings: Figure 1 is a view in side elevation; Fig. 2 is a view in front elevation with the shaft broken away; Fig. 3 is a longitudinal vertical sectional view; Fig. 4 is a top plan view showing the mechanism for holding the movable parts against movement, some of the parts being shown in section; Fig. 5 is a view in elevation of the tripping mechanism.

A represents the frame, and 1, 1 are the legs or supports upon which the frame is mounted. Slidably mounted upon the frame is a hollow shaft 2, which is provided with an elongated slot 3 at its upper end. Connected to the lower end of the shaft 2 is a disk 4, to which is connected a ring 5 by bolts 6. Removably connected to the ring 5 are a plurality of spears or prongs 7, 7. Mounted upon the front end 8 of the frame A is a plate 9. The plate 9 is provided with a block 10, which has a vertical opening 11 therein in which a pawl 12 slides, the pawl being connected to a lever 13 which is pivotally mounted upon the plate 9. The stud 14 on the lever 13 has a link 15 connected thereto, which link is connected to a rod 16 which slides in the hollow shaft 2, the link 15 extending through the elongated slot 3 in the shaft and being connected to the upper end of the rod 16.

A pin 17 is connected to the plate 9, and pivotally mounted thereon is a dog 18, which engages the lower side of the link 15. A coiled spring 19 is mounted upon the pin and is connected to the dog 18 for causing the dog to move upward. The tension of this spring, therefore, causes the link to always be drawn upward, and this movement of the link will draw the rod 16 upward. Connected to the lower end of the rod 16 is a bait holder 20, the bait holder being surrounded by the spears or prongs 7 so that when the parts are actuated the spears will entirely inclose the bait holder.

Mounted upon the frame is a shaft 21, and surrounding the shaft is a coiled spring 22, one end of which is connected to a stationary rod 23, and the other end to the collar 24, which collar is connected to the shaft 21. A crank arm 25 is formed on one end of the shaft 21, to which is connected a link 26, this link being connected to a cross pin 27. One end of the cross pin 27 slides in an elongated slot 28 in the end 8 of the frame, and the other end of the pin is connected to the shaft 2 by a set screw 29. The upper end of the link 26 is provided with a projection 30, which is adapted to be engaged by the pawl 12 for holding the spear disk and bait holder in operative position.

A handle 31 is mounted upon the shaft 21 for the purpose of placing the spring 22 under tension. As the shaft is being wound, the spring will be placed under tension, and when the handle is released, the link 26 will be engaged by the pawl 12, causing the spear disk to be held at its highest elevation, and above the bait holder.

The bait is secured to the bait holder 20, and as the animal endeavors to remove the bait from the holder, the rod 16 is drawn downward. This downward movement of the rod 16 causes the link 15 to be moved, and thus causes the lever 13 to be actuated, whereby the pawl is moved vertically, releasing the link 26. Just as soon as the pawl is brought out of engagement with the link 26 the spring 22 will exert a force against the link 26, causing it to force the hollow shaft 2 downward. This movement causes the spears to be moved downward and inclose and surround the bait holder and penetrate the animal.

The spears and bait holder will under normal conditions return to their respective positions after each operation, but if there should be any additional weight placed upon the bait holder, for instance, the body of the animal pierced by the spears, the bait holder would not return to its set position. The spears could not return to their set position because the weight of the animal would still remain thereon, and as the spears when in their set position are above the bait holder, it would be necessary to carry the animal on the spears, above the bait holder, and if this is possible the bait holder would also be released and the parts would immediately return to their original or set positions. The spears will travel a considerable distance below the bait holder before the crank arm 25 has passed it center or traveled one half of its revolution, and if it was impossible to penetrate the animal sufficient to allow the crank arm to travel past its center or more than a half revolution, it is necessary to remove the animal from the spears to permit of the spears and bait holder to return to their set positions.

Having fully described my invention, what I claim as new and desire to secure by Letters Patent is:

1. In an animal trap, the combination with a frame, of a shaft movably mounted thereon carrying spears, an actuating mechanism, means pivotally connected to the shaft engaging the actuating mechanism, a bait holder, and means actuated upon the movement of the bait holder for causing the shaft to be operated.

2. In an animal trap, the combination with a frame, of a shaft movably mounted thereon carrying spears, an actuating mechanism, means pivotally connected to the shaft engaging the actuating mechanism, means engaging said pivotal means for holding the shaft against movement, and a bait holder adapted when actuated to operate said holding means for releasing the shaft.

3. In an animal trap, the combination with a frame, of a shaft movably mounted thereon carrying spears, means for holding the shaft against movement, means carried by the shaft engaged by said holding means, means connected to said shaft carried means for imparting a reciprocating movement thereto to actuate the shaft, and a bait holder connected to said holding means adapted to release the shaft upon the movement of the bait holder for causing the shaft to be operated.

4. In an animal trap, the combination with a frame, of a shaft movably mounted thereon carrying spears, means for holding said shaft against movement, means carried by the shaft engaged by said holding means, means connected to said shaft carried means for imparting a reciprocating movement thereto to actuate the shaft, and a bait holder adapted to release said shaft upon the movement of the bait holder.

5. In an animal trap, the combination with a frame, of a shaft having spears thereon, a link connected to the shaft, means connected to the link for reciprocating the shaft, a pawl engaging said link for holding the shaft against movement, a movable bait holder, means connecting the pawl with the bait holder whereby upon the actuation of the bait holder the pawl will be caused to release the shaft, and means for causing said pawl to be brought into position to engage said link for locking the shaft in position for the next operation.

In testimony whereof I affix my signature, in the presence of two witnesses.

GEORGE P. MARQUARDT.

Witnesses:
T. R. WILLIAMS,
I. L. ECKHOLDT.

Copies of this patent may be obtained for five cents each, by addressing the "Commissioner of Patents, Washington, D. C."